United States Patent [19]

Takeo

[11] Patent Number: 5,073,961
[45] Date of Patent: Dec. 17, 1991

[54] METHOD FOR JUDGING THE CORRECTNESS OR INCORRECTNESS OF A DETECTED SUBDIVISION PATTERN OF RADIATION IMAGES

[75] Inventor: Hideya Takeo, Kanagawa, Japan

[73] Assignee: Fuji Photo Film Co., Ltd., Kanagawa, Japan

[21] Appl. No.: 414,230

[22] Filed: Sep. 29, 1989

[30] Foreign Application Priority Data

Oct. 5, 1988 [JP] Japan ................. 63-251617

[51] Int. Cl.$^5$ .............................................. G06K 9/56
[52] U.S. Cl. .......................................... 382/27; 382/9; 382/50; 382/61
[58] Field of Search ................. 382/9, 50, 61, 34, 27; 364/550, 551; 358/448, 452, 453

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/414 |
| 4,387,428 | 6/1983 | Ishida et al. | 364/414 |
| 4,476,497 | 10/1984 | Oshikoshi et al. | 382/61 |
| 4,491,962 | 1/1985 | Sakou et al. | 382/50 |
| 4,527,060 | 7/1985 | Suzuki et al. | 250/327.2 |
| 4,578,713 | 3/1986 | Tsao et al. | 382/50 |
| 4,646,252 | 2/1987 | Terashita | 382/34 |
| 4,654,873 | 3/1987 | Fujisawa et al. | 382/9 |
| 4,707,745 | 11/1987 | Sakano | 382/50 |
| 4,710,821 | 12/1987 | Ohta | 382/9 |
| 4,748,677 | 5/1988 | Yokomizo | 382/50 |
| 4,901,359 | 2/1990 | Bruder | 382/61 |
| 4,910,785 | 3/1990 | Nakatsuma | 382/9 |
| 4,955,067 | 9/1990 | Shimura | 382/50 |

FOREIGN PATENT DOCUMENTS

56-11395 2/1981 Japan .
61-5193 2/1986 Japan .

Primary Examiner—Michael Razavi
Attorney, Agent, or Firm—Sughrue, Mion, Zinn, Macpeak & Seas

[57] ABSTRACT

A method for judging the correctness or incorrectness of a subdivision pattern detected on a recording medium comprises the steps of detecting the subdivision pattern in cases where the recording area of a recording medium was divided into a plurality of regions and radiation images were recorded in the respective regions. The detection is based on an image signal made up of a series of image signal components obtained from the recording medium which has been subjected to a radiation image recording process. A characteristic value representing the image signal components corresponding to each of the divided regions is then calculated and compared with a predetermined value. A judgment as to whether the detected subdivision pattern is or is not correct is based on the results of the comparison made between the characteristic value corresponding to each of the divided regions and the predetermined value.

1 Claim, 6 Drawing Sheets

METHOD FOR JUDGING THE CORRECTNESS OR INCORRECTNESS OF A DETECTED SUBDIVISION PATTERN OF RADIATION IMAGES

BACKGROUND OF THE INVENTION

1. Field of the Invention

This invention relates to a method for judging the correctness or incorrectness of a subdivision pattern detected on a recording medium wherein the subdivision pattern is detected in cases where the recording area of a recording medium was divided into a plurality of regions and radiation images were recorded in the respective regions, the detection being based on an image signal made up of a series of image signal components obtained from the recording medium which has been subjected to a radiation image recording process, and wherein thereafter a judgment is made as to whether the detected subdivision pattern is or is not correct.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen for the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in Japanese Unexamined Patent Publication Nos. 55(1980)-12429, 56(1981)-11395, 55(1980)-163472, 56(1981)-104645, and 55(1980)-116340, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored thereon during its exposure to the radiation. The light emitted by the stimulable phosphor sheet upon stimulation thereof is photoelectrically detected and converted into an electric image signal, and the image signal is used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted by the stimulable phosphor varies over a wide range and is proportional to the amount of energy stored during its exposure to the radiation, it is possible to obtain a visible image having a desirable density regardless of the energy intensity of the radiation to which the stimulable phosphor sheet was exposed. In order to obtain a desirable image density, an appropriate read-out gain is set when the emitted light is being detected with a photoelectric read-out means and converted into an electric signal to be used in the reproduction of a visible image on a recording material, such as photographic film, or on a display device such as a CRT.

In order to detect an image signal accurately, certain factors which affect the image signal must be set in accordance with the dose of radiation delivered to the stimulable phosphor sheet and the like. A novel radiation image recording and reproducing system which accurately detects an image signal has been proposed in, for example, Japanese Unexamined Patent Publication Nos. 58(1983)-67240, 58(1983)-67241 and 58(1983)-67242. The proposed radiation image recording and reproducing system is constituted such that a preliminary read-out operation (hereinafter simply referred to as the "preliminary read-out") is carried out in order approximately to ascertain the radiation image stored on the stimulable phosphor sheet. In the preliminary read-out, the stimulable phosphor sheet is scanned with a light beam having a comparatively low energy level, and a preliminary read-out image signal obtained during the preliminary read-out is analyzed. Thereafter, a final read-out operation (hereinafter simply referred to as the "final read-out") is carried out to obtain the image signal, which is to be used during the reproduction of a visible image. In the final read-out, the stimulable phosphor sheet is scanned with a light beam having an energy level higher than the energy level of the light beam used in the preliminary read-out, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image read-out and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary read-out is or is not carried out, it has also been proposed to analyze the image signal (including the preliminary read-out image signal) obtained and to adjust image processing conditions, which are to be used when the image signal is processed, on the basis of the results of an analysis of the image signal. The proposed method is applicable to cases where an image signal is obtained from a radiation image recorded on a recording medium such as conventional X-ray film, as well as to systems using stimulable phosphor sheets.

Also, in the course of radiation image recording, it is often desirable for portions of an object which are not related to a diagnosis or the like to be prevented from being exposed to radiation. Further, when object portions, which are not related to a diagnosis or the like, are exposed to radiation, the radiation is scattered by such portions to the portion that is related to a diagnosis or the like, and the image quality is adversely affected by the scattered radiation. Therefore, when a radiation image is recorded on the recording medium, an irradiation field stop is often used to limit the irradiation field to an area smaller than the overall recording region of the recording medium so that radiation is irradiated only to the necessary portions of the object and to part of the recording medium. In cases where the read-out conditions for the final read-out and/or the image processing conditions are calculated on the basis of the results of an analysis of the image signal in the manner described above and the irradiation field was limited during the recording of the radiation image, the radiation image cannot be ascertained accurately if the image signal is analyzed without the shape and location of the irradiation field being taken into consideration. As a result, incorrect read-out conditions and/or incorrect image processing conditions are set, and a visible radiation image which is suitable for diagnostic purposes cannot be reproduced. In order to eliminate the aforesaid problem, it is necessary to determine the shape and location of the irradiation field and then to calculate the read-out conditions for the final read-out and/or the image processing conditions on the basis of only the image signal representing image information stored in the region inside of the irradiation field.

In the aforesaid radiation image recording and reproducing systems, a subdivision image recording operation is often carried out wherein the whole recording area of a single recording medium (such as a stimulable phosphor sheet or X-ray film) is divided into a plurality of regions and different radiation images are recorded in each region. In such cases, for example, the subdivision pattern is found from the preliminary read-out image signal, and appropriate read-out conditions are calculated for each of the subdivided regions. A final read-out is then carried out under conditions which approximate those thus calculated. However, in a radiation image comprising a background region and an object image, the values of the image signal change sharply at the boundaries between the background region, upon which radiation impinged directly, and the object image. Therefore, even if the recording area of the recording medium is not divided into a plurality of regions and a single radiation image is recorded thereon, the boundary between the background region and the object image of the single radiation image can be detected by mistake as the boundary of a subdivided region. In cases where a single radiation image was recorded over the whole recording area of the recording medium, the object image in the radiation image should be detected, and the read-out conditions for the final read-out should be determined from the image signal components of the preliminary read-out image signal corresponding to the object image. However, if the boundary between the background region and the object image in the radiation image is detected by mistake as the boundary of a subdivided region, the object image and the background region are regarded as being independent radiation images recorded in subdivided regions. This results in read-out conditions for the final read-out being calculated for each of the regions which are regarded as being subdivided, and the final read-out is carried out under conditions which approximate the read-out conditions thus calculated. As a result, components of the preliminary read-out image signal corresponding to the background region greatly affect the calculation of the read-out conditions for the final read-out. Therefore, the read-out conditions which are set for the final read-out become markedly different from the read-out conditions suitable for the object image.

OBJECT OF THE INVENTION

In view of the above circumstances, the object of the present invention is to provide a method for judging the correctness or incorrectness of a detected subdivision pattern on a recording medium, which enables the read-out conditions for the final read-out and/or the image processing conditions to be determined more accurately.

SUMMARY OF THE INVENTION

The present invention provides a method for judging the correctness or incorrectness of a subdivision pattern which has been detected on a recording medium, which comprises the steps of:

i) detecting the subdivision pattern in cases where the entire recording area of a recording medium was divided into a plurality of regions and radiation images were recorded in the respective regions, the subdivision pattern being determined from the characteristics of an image signal made up of a series of image signal components and obtained from a recording medium which has been subjected to radiation image recording, ii) calculating a characteristic value for the image signal components corresponding to each of the subdivided regions, iii) comparing said characteristic value with a predetermined value, and iv) basing a judgment as to whether the detected subdivision pattern is or is not correct on the results of the comparison made between said characteristic value corresponding to each of the subdivided regions and said predetermined value.

The term "characteristic value of the image signal components" as used herein means the value used to discriminate whether a region of a recording medium is or is not a background region. During the recording of a radiation image, radiation directly impinges upon the background region of a recording medium without passing through an object (or without being reflected by the object). Therefore, the amount of radiation to which the background region of the recording medium is exposed is larger than the amount of radiation to which other regions of the recording medium (for example, the object image region and the region outside of the irradiation field) are exposed. The image density in the background region is also approximately uniform and exhibits little change. For example, the characteristic value may be the mean value of the values of the image signal components representing image information stored in a region, the median value of the values of said image signal components, or the value calculated from the formula expressed as (maximum value of the values of said image signal components + minimum value of the values of said image signal components)/2. Alternatively, the characteristic value may be the value obtained from a division of the number of image signal components corresponding to the region, which have values not larger than a predetermined threshold value Th1, by the total number of the image signal components corresponding to the region. The characteristic value may also be the variance of the values of the image signal components corresponding to the region, the mean value of the differentiated values which are obtained when the values of the image signal components corresponding to the region are differentiated, or the variance of said differentiated values. Furthermore, the characteristic value may be the value obtained from a division of the number of image signal components corresponding to the region, the differentiated values of which image signal components are not larger than a predetermined threshold value Th2, by the total number of the image signal components corresponding to the region.

The image signal components may be proportional or inversely proportional to the amount of radiation to which the recording medium was exposed. Alternatively, the image signal components may be proportional or inversely proportional to the logarithmic value of the amount of radiation to which the recording medium was exposed.

As described above, during the recording of the radiation image, radiation directly impinges upon the background region of the recording medium without passing through an object or being reflected therefrom. Therefore, in cases where the values of the image signal components are proportional to the amount of radiation which impinged upon the recording medium, the values of the image signal components corresponding to the background region are large. Also, in the background region, the values of the image signal components corresponding to adjacent picture elements do not differ very much from each other; i.e. they are approximately uniform.

On the other hand, radiation which has passed through an object (or which has been reflected from the object) impinges upon the object image region of the recording medium during the recording of the radiation image. Therefore, the mean amount of radiation which impinges upon the object image region is smaller than the mean amount of radiation which impinges upon the background region, and the level of the image signal (i.e. the density of the image) changes sharply at the boundary between portions of the image representing different tissues of the object.

The method for judging the correctness or incorrectness of a detected subdivision pattern on a recording medium in accordance with the present invention is based on the findings described above. With this method, after a subdivision pattern is detected, a characteristic value is calculated for the image signal components corresponding to each of the subdivided regions. The characteristic value is compared with a predetermined value. A judgement as to whether the detected subdivision pattern is or is not correct is based on the results of the comparison made between the characteristic value corresponding to each of the subdivided regions and the predetermined value. In cases where the detected subdivision pattern is judged to be incorrect, for example, a method for more accurately detecting the subdivision pattern is employed in order to detect the correct subdivision pattern. Therefore, the image signal components corresponding to object images can be extracted accurately, and more appropriate read-out conditions for the final read-out and/or more appropriate image processing conditions can be set.

DESCRIPTION OF THE PREFERRED EMBODIMENTS

The present invention will hereinbelow be described in further detail with reference to the accompanying drawings.

Figure 6:
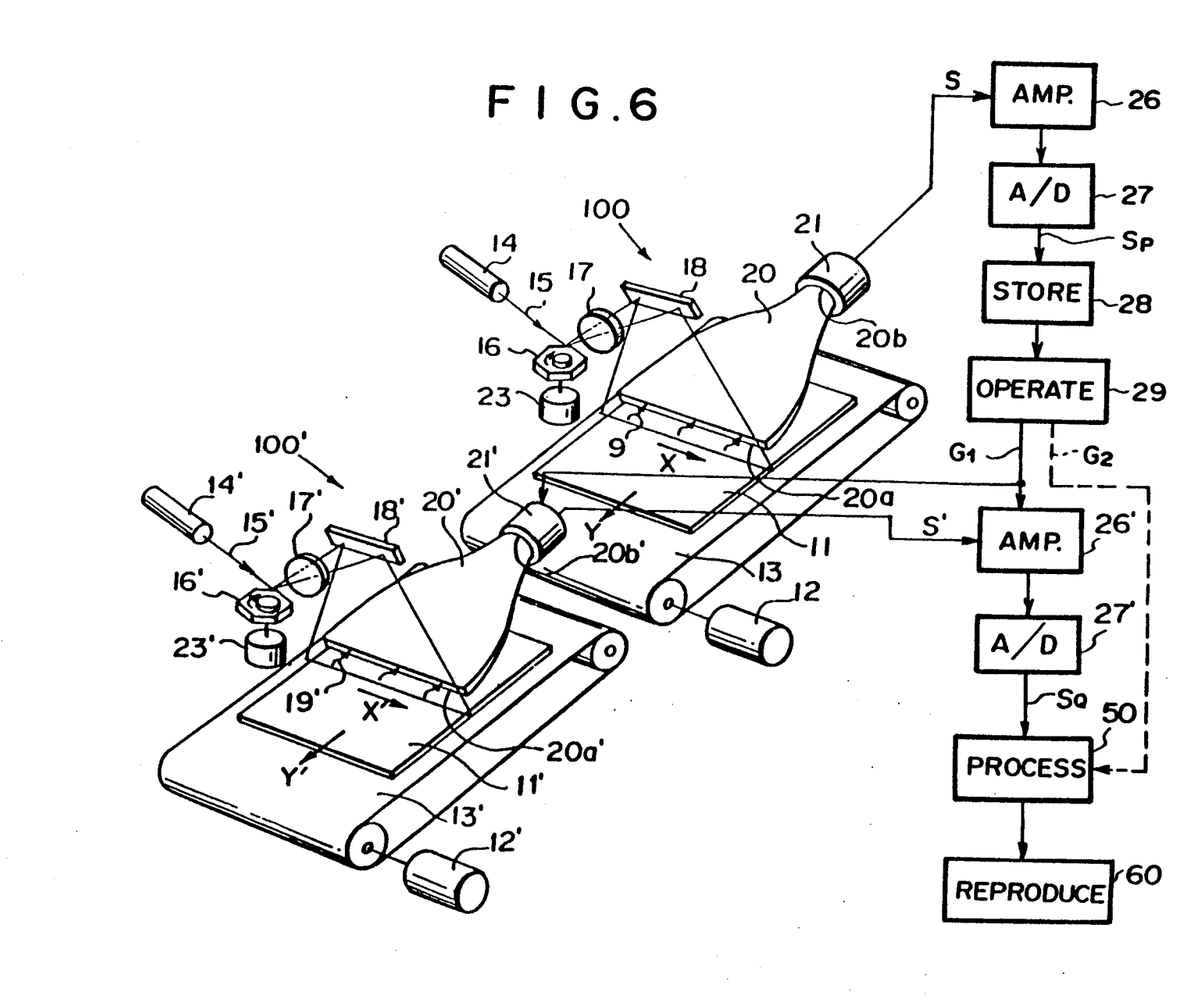
FIG. 6 is a perspective view showing an example of a radiation image read-out apparatus wherein an embodiment of the method for judging the correctness or incorrectness of a subdivision pattern detected on a recording medium in accordance with the present invention is employed.

FIG. 6 is a perspective view showing an example of a radiation image read-out apparatus wherein an embodiment of the method for judging the correctness or incorrectness of a subdivision pattern detected on a recording medium in accordance with the present invention is employed. In this embodiment, a stimulable phosphor sheet is utilized and a preliminary read-out is carried out.

A stimulable phosphor sheet 11 on which a radiation image has been stored is placed at a predetermined position in a preliminary read-out means 100 which carries out a preliminary read-out by scanning the stimulable phosphor sheet 11 with a light beam having a low energy level, thereby releasing only part of the energy from the stimulable phosphor sheet 11 which was stored thereon during its exposure to radiation. The stimulable phosphor sheet 11 is conveyed in a sub-scanning direction indicated by the arrow Y by a sheet conveyance means 13, which is constituted of an endless belt or the like and which is operated by a motor 12. A laser beam 15, which has a low energy level and is produced by a laser beam source 14, is reflected and deflected by a rotating polygon mirror 16, which is quickly rotated by a motor 23 in the direction indicated by the arrow, and passes through a converging lens 17 constituted of an $f\theta$ lens or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20, and photoelectrically detected by a photomultiplier 21. The light guide member 20 is made from a light guiding material such as an acrylic plate, and has a linear light input face 20a, which is positioned so that it extends along the main scanning line on the stimulable phosphor sheet 11, and a ring-shaped light output face 20b, which is positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which represents the radiation image, is converted into an electric signal by the photomultiplier 21.

An analog output signal S is generated by the photomultiplier 21 and is logarithmically amplified by a logarithmic amplifier 26. It is then digitized by an A/D converter 27 into a preliminary read-out image signal SP. The preliminary read-out image signal SP is proportional to the logarithmic value of the amount of the emitted light 19.

In the preliminary read-out, read-out conditions, such as the voltage applied to the photomultiplier 21 or the amplification factor of the logarithmic amplifier 26, are adjusted so that image information can be ascertained even if the amount of energy stored on the stimulable phosphor sheet 11 varies over a wide range.

The preliminary read-out image signal SP obtained in the manner described above is fed into a storage means 28 and stored therein. Thereafter, the preliminary read-out image signal SP is read from the storage means 28, and fed into an operation means 29. In cases where the recording region of the stimulable phosphor sheet 11 was divided into a plurality of regions, on each of which regions a radiation image could be recorded, the operation means 29 determines the subdivision pattern from the preliminary read-out image signal SP and thereafter judges whether the detected subdivision pattern is or is not correct. The operation means 29 then calculates the read-out conditions G1 for the final read-out, such as the voltage to be applied to a photomultiplier 21' or the amplification factor to be set in a logarithmic amplifier 26', on the basis of only those components of the preliminary read-out image signal SP which correspond to the region occupied by an object image.

A stimulable phosphor sheet 11', on which the preliminary read-out has been finished, is placed at a predetermined position in the final read-out means 100' and scanned with a laser beam 15' having an energy level higher than that of the laser beam 15 used in the preliminary read-out. In this manner, an image signal is detected using the read-out conditions G1 which have been adjusted as described above. The configuration of the final read-out means 100' is nearly the same as that of the preliminary read-out means 100, and therefore elements corresponding to those constituting the preliminary read-out means 100 are numbered with corresponding primed reference numerals in FIG. 4.

After the image signal is digitized in an A/D converter 27', the resulting image signal SQ is fed into an image processing means 50, which carries out appropriate image processing on the image signal SQ. After being image processed, the image signal is fed into a reproducing apparatus 60, which reproduces a visible image from the image signal.

How the operation means 29 detects the subdivision pattern from the preliminary read-out image signal SP and judges whether the detected subdivision pattern is or is not correct will be described hereinbelow.

In the present invention, no limitation is imposed on how the subdivision pattern is detected. By way of example, the subdivision pattern may be detected with the method described below, which has been proposed by the applicant in Japanese Patent Application No. 62(1987)-092759.

Figure 1:
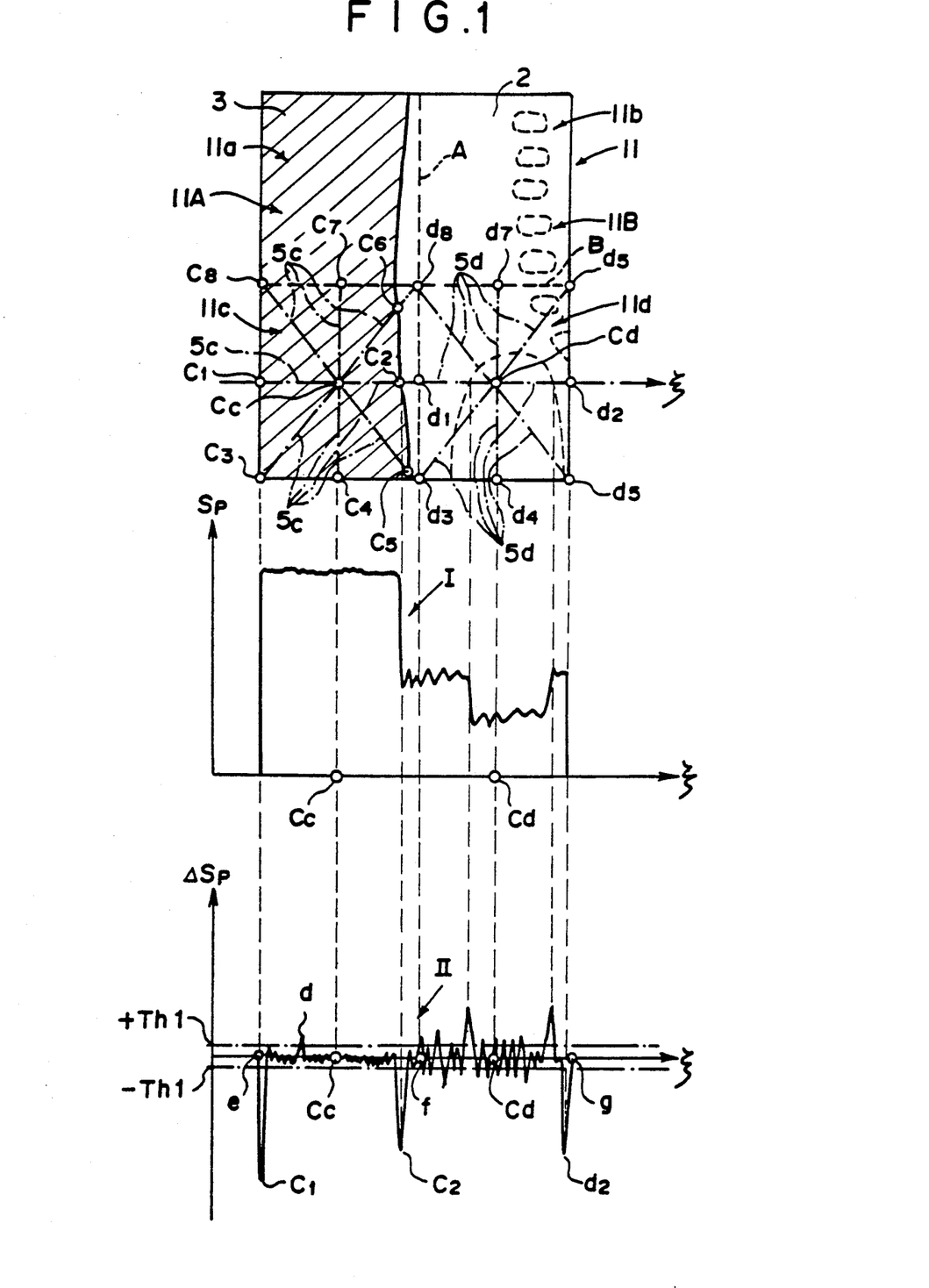
FIG. 1 is an explanatory view showing an example of a radiation image, a preliminary read-out image signal representing the radiation image, and differentiated values of the preliminary read-out image signal.

FIG. 1 shows an example of a radiation image stored on a stimulable phosphor sheet, a preliminary read-out image signal SP obtained during a read-out operation carried out on the stimulable phosphor sheet, and differentiated values $\neq$SP obtained when a differentiation processing operation is performed on the preliminary read-out image signal SP.

With reference to FIG. 1, a single radiation image of the side of the abdomen of a human body is stored over the entire area of a stimulable phosphor sheet 11. The radiation image is composed of an object image 2 representing various tissues of the abdomen of a human body, and a background region 3 upon which radiation impinged directly without having passed through the object (or without being reflected therefrom).

As described above, the single radiation image takes up the whole area of the stimulable phosphor sheet 11. In this example of the system, radiation images may be stored with the following four types of subdivision patterns on a single stimulable phosphor sheet 11: (1) a null subdivision pattern wherein a single image takes up the whole area of the stimulable phosphor sheet 11, (2) a two-on-one horizontal type of subdivision pattern wherein the recording area of the stimulable phosphor sheet 11 is divided along line A into two regions so that two independent radiation images can be stored side by side, (3) a two-on-one vertical type of subdivision pattern wherein the recording area of the stimulable phosphor sheet 11 is divided along line B into two regions located one above the other, and (4) a four-on-one type of subdivision pattern wherein the recording area of the stimulable phosphor sheet 11 is divided into four regions along lines A and B. Therefore, the shape and location of the irradiation field are determined for each of four regions 11a, 11b, 11c, and 11d, i.e. each of the smallest possible subdivided regions. In this embodiment, the shape and location of an irradiation field are determined with the method described below, which has been proposed in Japanese Patent Application No. 62(1987)-93633.

By way of example, how the shape and locations of the irradiation fields in the regions 11c and 11d are determined will be described below. As for the region 11c, differentiation operations are carried out on the image signal components of the preliminary read-out image signal SP corresponding to the picture elements arrayed along each of a plurality of lines 5c, 5c, ... which extend radially from the center point Cc of the region 11c. Also, as for the region 11d, differentiation operations are carried out on the image signal components of the preliminary read-out image signal SP corresponding to the picture elements arrayed along each of a plurality of lines 5d, 5d, ... which extend radially from the center point Cd of the region 11d. The points for which the corresponding values of the preliminary read-out image signal SP decrease sharply are detected as contour points of the regions, and the set of all detected contour points in a region is considered to define the shape and locations of the irradiation field.

How contour points are detected on a particular line, the $\xi$ axis, will be described hereinbelow.

Curve I represents the values of the image signal components of the preliminary read-out image signal SP corresponding to the picture elements arrayed along the $\xi$ axis.

The values of the image signal components of the preliminary read-out image signal SP are largest for the background region 3 which is located inside of the irradiation field 2 and upon which radiation impinged directly. The values of the image signal components of the preliminary read-out image signal SP corresponding to the object image 2 are smaller than those for the background region 3.

Curve II represents the results of differentiation carried out on the image signal components of the preliminary read-out image signal SP represented by curve I starting from that signal component corresponding to the center point Cc of the region 11c and continuing with signal components corresponding to positions in the region 11c lying in the negative direction along the $\xi$ axis (i.e. leftward in FIG. 1) and in the positive direction along the $\xi$ axis (i.e. rightward in FIG. 1). Curve II also represents the results of differentiation carried out on the image signal components of the preliminary read-out image signal SP represented by curve I starting from that signal component corresponding to the center point Cd of the region 11d and continuing with signal components corresponding to positions in the region 11d lying in the negative direction along the $\xi$ axis (i.e. leftward in FIG. 1) and in the positive direction along the $\xi$ axis (i.e. rightward in FIG. 1).

For the part of curve II corresponding to region 11c, there is a major peak C1 which projects downwardly to the left of the center point Cc. Therefore, the position corresponding to the peak C1 (i.e. the edge of the stimulable phosphor sheet 11) is detected as a contour point. For the same part of curve II, there is a major peak C2 which projects downwardly to the right of point Cc. Therefore, the position corresponding to the peak C2 is detected as a contour point. Actually, the position corresponding to the peak C2 is not a contour point but a point in the radiation image where the image density changes. However, a large downwardly projecting peak appears at said position as it does for a contour point of the irradiation field, and therefore such a point is often detected by mistake as a contour point.

For the part of curve II corresponding to region 11d, there is no major peak which projects downwardly to the left of center point Cd. For the same part of curve II, there is a major peak d2 which projects downwardly at a point to the right of center point Cd corresponding to the edge of the stimulable phosphor sheet 11. In this case, it is determined that the irradiation field continues to the edge of region 11d.

In the manner described above, contour points cl (l denotes a positive integer and l=1 to 8 in the embodiment of FIG. 1) are detected respectively on the plurality of lines 5c, 5c, ... each of which connects the center point Cc with the edge of the region 11c. Also, contour points dl are detected respectively on the plurality of lines 5d, 5d, ... each of which connects the center point Cd with the edge of the region 11d. After the contour points cl and dl are detected, lines which connect the contour points cl are regarded as the contour of the irradiation field in the region 11c, and lines which connect the contour points dl are regarded as the contour of the irradiation field in the region 11d.

Figure 2A:
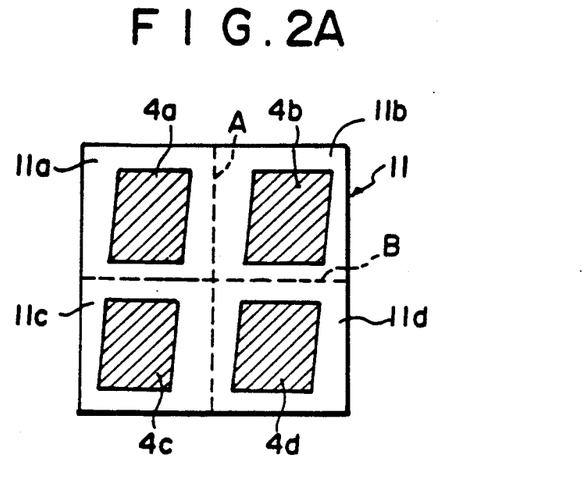
FIGS. 2A, 2B, and 2C are schematic views showing different examples of shapes and locations of irradiation fields.
Figure 2B:
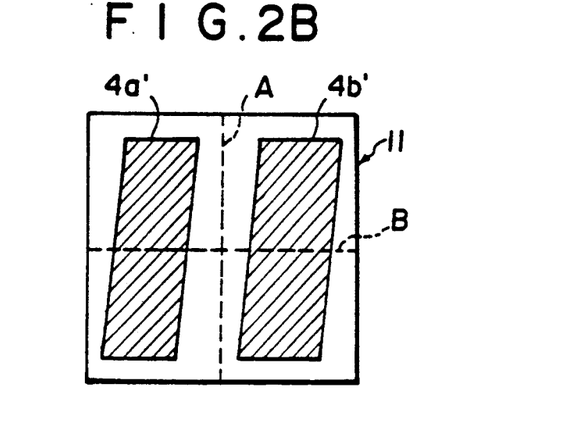
Figure 2C:
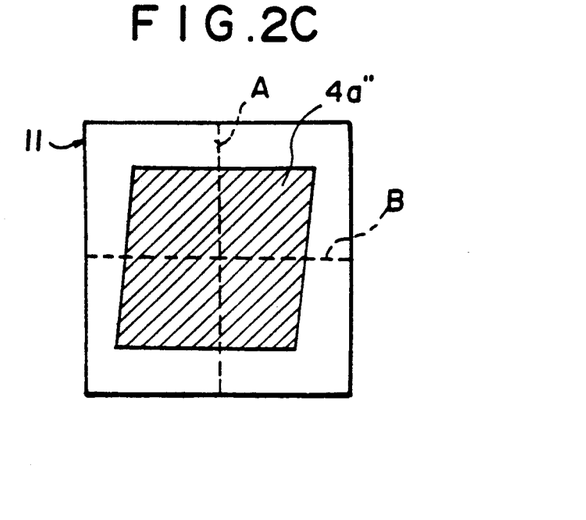

FIGS. 2A, 2B, and 2C are schematic views showing various examples of the shapes and locations of irradiation fields which are different from those shown in FIG. 1 and which have been determined in the manner described above.

As shown in FIG. 2A, in cases where irradiation fields 4a through 4d in the regions 11a through 11d are spaced apart from one another, the subdivision pattern is found to be a four-on-one type of subdivision pattern. As shown in FIG. 2B, in cases where irradiation fields 4a' and 4b' continue across line B, the subdivision pattern is found to be a two-on-one type of horizontal subdivision pattern. As shown in FIG. 2C, in cases where an irradiation field 4a" continues across lines A and B, the subdivision pattern is found to be a null subdivision pattern, i.e. the recording medium has not been subdivided.

Figure 3:
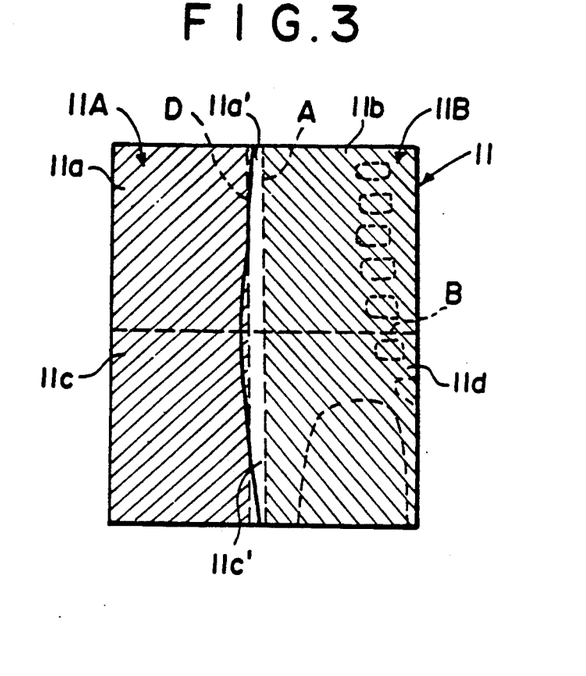
FIG. 3 is an explanatory view showing a subdivision pattern detected from the preliminary read-out image signal representing the radiation image shown in FIG. 1.

FIG. 3 is an explanatory view showing how a subdivision pattern is detected in the manner described above from the preliminary read-out image signal representing the radiation image shown in FIG. 1.

As for the region 11a, the contour points (i.e. the erroneously detected contour points) lie on a straight line D. Therefore, region 11a is found to be partitioned by the line A from the region 11b. A partial region 11a' is found to be present in the region outside of the irradiation field. Also, the region 11c is found to be partitioned by the line A from the region 11d. A partial region 11c' is found to be present in the region outside of the irradiation field.

Also, the irradiation fields (background regions in this case) detected in the regions 11a and 11c are continuous with each other. Therefore, the regions 11a and 11c are regarded as a single region which is not partitioned by line B. As for regions 11b and 11d, they are regarded as one irradiation field. Therefore, regions 11b and 11d are regarded as a single continuous region. Specifically, the subdivision pattern on the stimulable phosphor sheet 11 is detected as a two-on-one type of subdivision pattern comprising a left region 11A and a right region 11B.

After the subdivision pattern is detected in the manner described above, a judgment is made in the manner described below as to whether the detected subdivision pattern is or is not correct.

In this embodiment, a normalized count value is employed as the characteristic value of the preliminary read-out image signal SP on which said judgment is based. The normalized count value is calculated during an operation wherein the number of the differentiated image signal values $\Delta SP$, which result when differentiation processing is carried out on the image signal components corresponding to each of the regions 11A and 11B and which fall within the range of a predetermined threshold value $+Th1$ to a predetermined threshold value $-Th2$, is divided by the total number of the image signal components corresponding to each of the regions 11A and 11B. When the normalized count value calculated for a region is not smaller than a predetermined value Th2, count value is seen as high or "H", and it is judged that a background region covers most of the area of the region. When the normalized count value calculated for a region is smaller than a predetermined value Th2, the count value is seen as low or "L", and it is judged that an effective object image is present in the region.

How the operation described above is carried out will be described hereinbelow with reference to FIG. 1. In FIG. 1, the differentiated values $\Delta SP$ are calculated when differentiation processing is carried out on the image signal components of the preliminary read-out image signal SP corresponding to positions located along each of a plurality of lines in regions 11A and 11B which are, for example, parallel to the $\xi$ axis. For the differentiated values $\Delta SP$ which result when differentiation processing is carried out on image signal components of the preliminary read-out image signal SP corresponding to positions located along the $\xi$ axis in region 11A (i.e. the differentiated values $\Delta SP$ falling between point "e" and point "f" on curve II), curve II exhibits no large peak except for a peak "d", which is considered to be caused by noise. A normalized count value F is calculated with an operation wherein the number of differentiated image signal values $\Delta SP$ which result when differentiation processing is carried out on the image signal components corresponding to the whole area of region 11A and which fall within the range of the predetermined threshold value $+Th1$ to the predetermined threshold value $-Th1$, is divided by the total number of image signal components of the preliminary read-out image signal SP corresponding to the region 11A. Because the curve representing the differentiated image signal values $\Delta SP$ exhibits no large peak except for peak "d", the normalized count value F is expressed as $F=1-\alpha$ where $\alpha$ is a very small number. Therefore, when the value F is compared with the predetermined value (e.g. 0.85), it is found that $F>Th2$, i.e. "H" is assigned to the value F.

For the radiation image shown in FIG. 1, "H" is assigned to the normalized count value F corresponding to region 11A, and "L" is assigned to that corresponding to region 11B. Therefore, it is judged that the subdivision pattern detected in the manner described above is incorrect. It is also judged that regions 11A and 11B have not two independent radiation images, but a single radiation image which extends over both regions 11A and 11B, stored therein.

In the aforesaid embodiment, a normalized count value is employed as the characteristic value of the image signal components. However, in the present invention the characteristic value is not limited to a normalized count value. For example, the maximum value of the differentiated image signal values $\Delta SP$, which result when differentiation processing is carried out on the image signal components corresponding to positions located along each of a plurality of lines distributed over each of the regions 11A and 11B, may be extracted for each of said plurality of lines. The median value of the maximum values thus extracted for the lines may then be calculated and compared with a predetermined value. Alternatively, the maximum value of the differentiated image signal values $\Delta SP$, which result when differentiation processing is carried out on the image signal components corresponding to each of the regions 11A and 11B, may merely be extracted for each region and compared with a predetermined value. However, in order to eliminate the adverse effects of noise or the like, the median value of the maximum values, which are extracted from the differentiated image signal values $\Delta SP$ which result when differentiation processing is carried out on the image signal components corresponding to positions located along each of a plurality of lines distributed over each of the regions 11A and 11B, should be calculated and compared with the predetermined value.

Alternatively, the probability density function of the image signal components corresponding to each region may be created, and a characteristic value may be determined from the probability density function.

Figure 4:
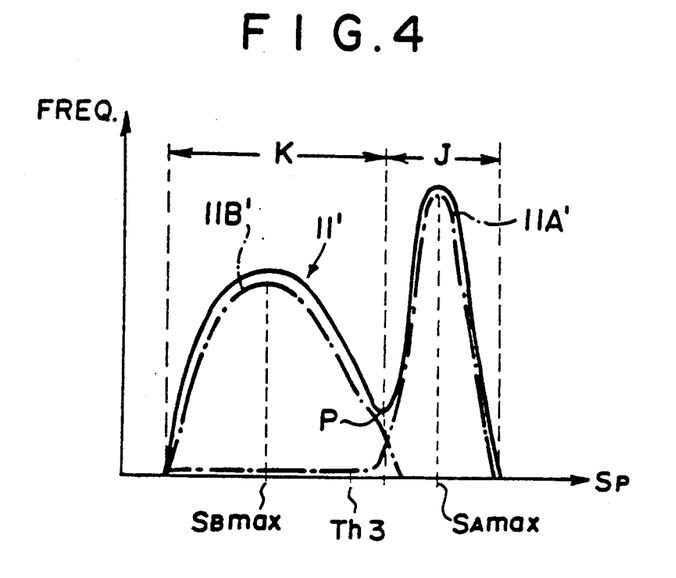
FIG. 4 is a graph showing the probability density function of the entire preliminary read-out image signal, and the probability density functions of the image signal components of the preliminary read-out image signal corresponding to respective regions.

FIG. 4 is a graph showing the probability density function 11' of the preliminary read-out image signal SP corresponding to the whole area of the stimulable phosphor sheet 11 and the probability density functions 11A' and 11B' of only these image signal components of the preliminary read-out image signal corresponding to regions 11A and 11B.

By way of example, signal values SAmax and SBmax, the signal values of the preliminary read-out image signal which occur most frequently, i.e. the signal values corresponding to the maximum values of the probability density functions 11A' and 11B', are found. The region 11A includes the broad background region. Therefore, the signal value SAmax of the preliminary read-out image signal corresponding to region 11A is larger than the signal value SBmax of the preliminary read-out image signal corresponding to the region 11B. Therefore, the signal values SAmax and SBmax are compared with a predetermined value Th3 and a judgment as to whether the detected subdivision pattern is or is not correct is based on the results of the comparison.

As described above, various types of characteristic values may be employed in the present invention.

It has been judged that the radiation image shown in FIG. 1 is composed not of two radiation images located side by side but of a single radiation image. Therefore, the image signal component's of the preliminary read-out image signal SP which correspond to the object image 2 can be extracted. The read-out conditions P for the final read-out illustrated by FIG. 6 can then be determined from the extracted image signal components. Accordingly, during the final read-out, the information about the object image is detected with appropriate read-out conditions.

By way of example, in order to extract the image signal components of the preliminary read-out image signal SP corresponding to the object image 2, a constricted point P in the probability density function 11' of the preliminary read-out image signal SP corresponding to the whole area of the image shown in FIG. 4 is detected. The image signal components of the preliminary read-out image signal SP corresponding to the background region (i.e. those corresponding to section J in the probability density function) and the image signal components of the preliminary read-out image signal SP corresponding to the object image (i.e. those corresponding to section K in the probability density function) are separated from each other. The image signal components corresponding to section K are then extracted from the preliminary read-out image signal.

Figure 5A:
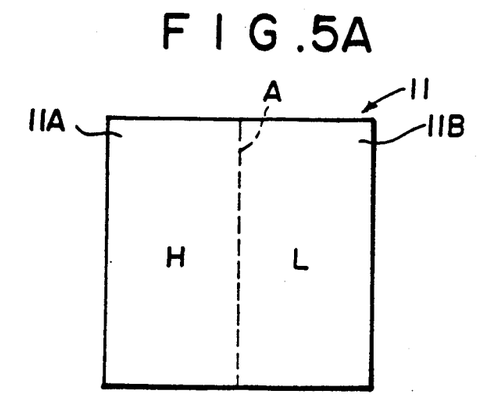
FIGS. 5A, 5B, and 5C are explanatory views showing the results of a comparison, which is made between characteristic values and a predetermined value, for various detected types of subdivision patterns.
Figure 5B:
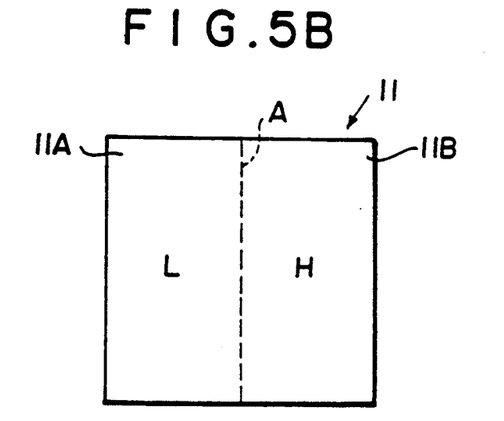
Figure 5C:
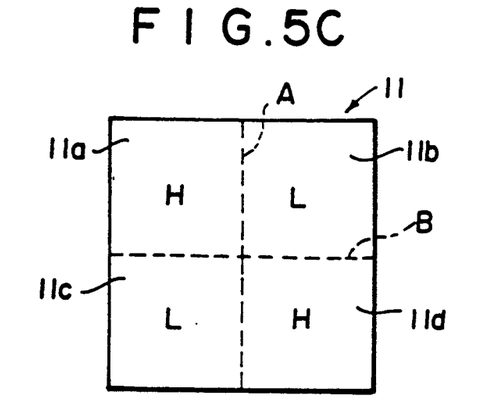

FIGS. 5A, 5B, and 5C are explanatory views showing the results of comparisons (given as "H" or "L") which is made between the characteristic values and the predetermined value for subdivision patterns detected in the manner described above.

FIG. 5A corresponds to the radiation image shown in FIG. 1. The subdivision pattern of the recording medium is detected as being a two-on-one horizontal type of subdivision pattern. However, the normalized count value F corresponding to the region 11A is found to be "H", and that corresponding to the region 11B is found to be "L". Therefore, it is determined that the regions 11A and 11B have not two independent radiation images but a single radiation image, which extends over both regions, stored therein. FIG. 5B shows a case where the normalized count value F corresponding to the region 11A is found to be "L", and that corresponding to the region 11B is found to be "H". In such a case, it is determined that a single radiation image is stored in regions 11A and 11B and extends over both regions. FIG. 5C shows a case where the whole recording area of the stimulable phosphor sheet 11 is divided into the four regions 11a through 11d. If the normalized count values F are found to be "H" and "L" as illustrated in FIG. 5C, it can be judged that the regions 11a through 11d are not independent from one another. However, it is not clear whether the subdivision pattern is a two-one-one vertical type or a two-one-one horizontal type of pattern. In such cases, one of various processes may be employed in order to combine the regions. For this purpose, for example, the subdivision pattern may be detected again with a different method, or the change in neighboring image signal components of the preliminary read-out image signal SP in the vicinity of the boundary lines A and B may be investigated. Alternatively, the subdivision pattern may be indiscriminately regarded as, for example, a two-one-one horizontal type of subdivision pattern. Even when the subdivision pattern is indiscriminately regarded as a two-one-one horizontal type of subdivision pattern, no serious problem arises because the extraction of the image signal components of the preliminary read-out image signal SP corresponding to the object image is carried out in the manner described above for each of the regions which are regarded as being divided.

Also, as for the background region, a region which was not exposed to radiation has the characteristic that the values of the image signal components of the preliminary read-out image signal SP corresponding to the unexposed region exhibit little change. Therefore, in cases where, for example, the region 11A shown in FIG. 5A is an unexposed region and a radiation image is stored only in region 11B, it often occurs, depending on how the characteristic value is selected, that regions 11A and 11B are not regarded as being independent from each other but regarded as having a single radiation image, which extends over both regions, stored therein. However, even in such cases, no serious problem arises because the extraction of the image signal components of the preliminary read-out image signal SP corresponding to the object image is thereafter carried out in the manner described above.

As described above, after the subdivision pattern has been detected, a judgment is made as to whether the detected subdivision pattern is or is not correct. Therefore, the subdivision pattern can be determined more accurately, and the read-out conditions G1 under which the final read-out is carried out can be set correctly.

In the embodiment of FIG. 6, the preliminary read-out means 100 and the final read-out means 100' are separate from each other. Alternatively, because the configurations of the preliminary read-out means 100 and the final read-out means 100' are approximately identical to each other, a single read-out means may perform both the preliminary read-out and the final read-out. In this case, after being subjected to the preliminary read-out, the stimulable phosphor sheet 11 may be moved back to the position at which image read-out is started. Thereafter, the final read-out may be carried out.

In cases where a single read-out means performs both the preliminary read-out and the final read-out, it is necessary to change the intensity of the light beam used in the preliminary read-out and the final read-out. For this purpose, various methods may be employed as described above; for example, a laser beam source or the like may change the intensity of the light beam.

In the aforesaid embodiment, the read-out conditions for the final read-out are adjusted by the operation means 29. Alternatively, predetermined read-out conditions may be used when the final read-out is carried out regardless of the characteristics of the preliminary read-out image signal SP. On the basis of the characteristics of the preliminary read-out image signal SP, the operation means 29 may adjust image processing conditions G2. The image processing conditions G2 are used in the image processing means 50 which carries out image processing on the image signal SQ. The image processing conditions G2 calculated by the operation means 29 may then be fed into the image processing means 50 as indicated by the broken line in FIG. 6. The operation means 29 may also adjust both the read-out conditions and the image processing conditions.

The aforesaid embodiment is applied to the radiation image read-out apparatus wherein a preliminary read-out is carried out. However, the method for judging the correctness or incorrectness of a detected subdivision pattern of radiation images in accordance with the present invention is also applicable to radiation image read-out apparatuses wherein no preliminary read-out operation is carried out, and only the aforesaid final read-out operations are carried out. In cases where, an image signal is obtained by use of predetermined read-out conditions. Based on the characteristics of the image signal, the conditions under which the image should be processed are calculated by an operation means. The image processing conditions thus calculated are taken into consideration when the image signal is processed.

The method for judging the correctness or incorrectness of a subdivision pattern detected on a recording medium in accordance with the present invention is not limited to the aforesaid embodiment wherein a stimulable phosphor sheet is used, and is also applicable to, for example, an X-ray image read-out apparatus wherein conventional X-ray film is used.

Figure 7:
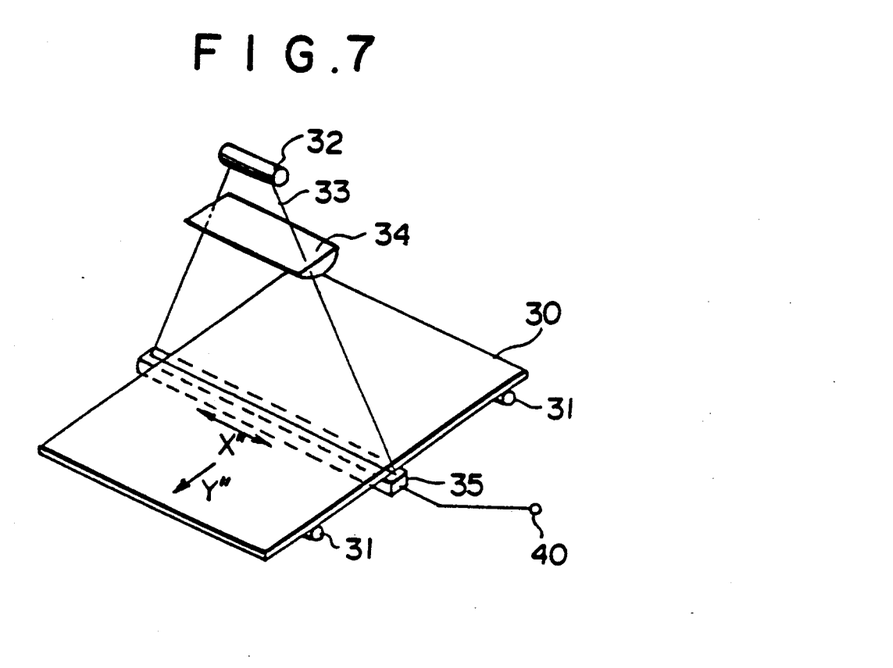
FIG. 7 is a perspective view showing an example of an X-ray image read-out apparatus wherein an X-ray image recorded on X-ray film is read out.

FIG. 7 is a perspective view showing an example of an X-ray image read-out apparatus wherein an X-ray image recorded on an X-ray film is read out.

With reference to FIG. 7, a sheet of X-ray film 30, on which an X-ray image has been recorded, is placed at a predetermined position and conveyed in the direction indicated by the arrow Y" by a film conveyance means 31.

Reading light 33, produced by an elongated light source 32 extending in one direction, is converged by a cylindrical lens 34 and linearly irradiated onto the X-ray film 30 along the directions indicated by the arrow X", which are approximately normal to the direction indicated by the arrow Y". A MOS sensor 35 is positioned below the X-ray film 30 so that it can receive the reading light 33 which has passed through the X-ray film 30, the intensity of which light has been modulated in accordance with the X-ray image recorded on the X-ray film 30. The MOS sensor 35 comprises a plurality of solid state photoelectric conversion devices which are arrayed linearly at intervals equal to the intervals between the picture elements of the X-ray image along the directions indicated by the arrow X". As long as the X-ray film 30 is conveyed in the direction indicated by the arrow Y" while being exposed to the reading light 33, the MOS sensor 35 detects the reading light, which has passed through the X-ray film 30, at predetermined intervals corresponding to the intervals between the picture elements of the X-ray image along the direction indicated by the arrow Y".

Figure 8:
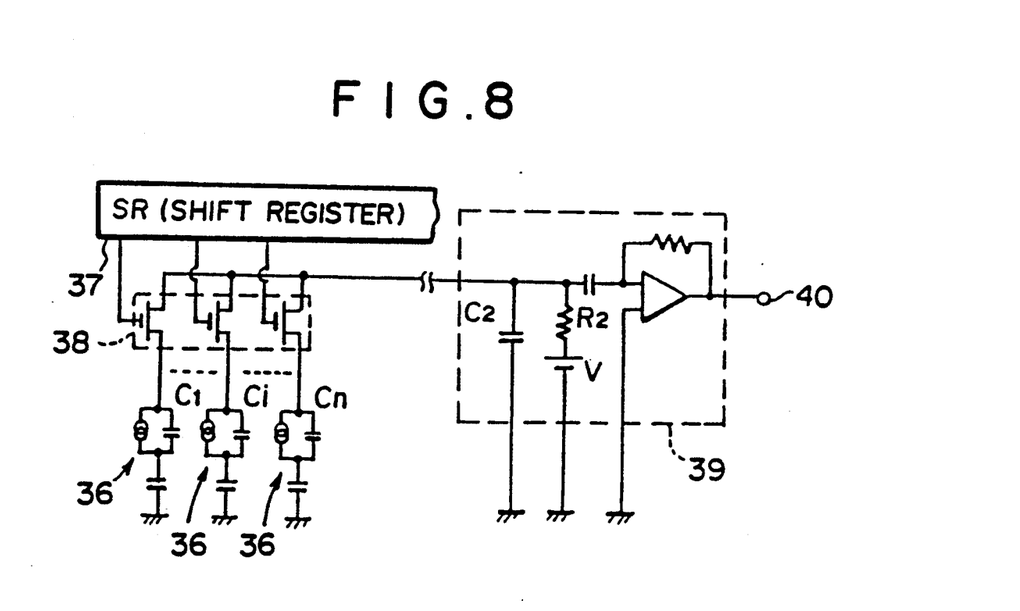
FIG. 8 is a circuit diagram showing an equivalent circuit for a MOS sensor.

FIG. 8 is a circuit diagram showing an equivalent circuit for the MOS sensor 35.

With reference to FIG. 8, photocarriers, which are generated when the reading light 33 impinges upon the solid state photoelectric conversion devices 36, 36, . . . , accumulate in capacitors $C_i$ ($i = 1, 2, \ldots, n$) of the solid state photoelectric conversion devices 36, 36, . . . The switches of a switch section 38 are turned on and off sequentially, which allows the number of photocarriers which have accumulated in the capacitors $C_i$ to be detected. A shift register 37 controls the switches of the switch section 38, and a time-serial image signal is obtained. The image signal is then amplified by a pre-amplifier 39 and is output at an output terminal 40 of the pre-amplifier 39.

The analog image signal output by the MOS sensor 35 is sampled and digitized into an image signal. Thereafter, the subdivision pattern is detected and the correctness or incorrectness of the detected subdivision pattern is judged in the same manner as in the aforesaid embodiment. In the embodiment shown in FIG. 7, the MOS sensor 35 may be replaced by a charge coupled device (CCD) or a charge priming device (CPD). Also, when the X-ray image is read out from the X-ray film 30, the X-ray film 30 may be two-dimensionally scanned with a light beam in the same manner as that described above for image read-out from the stimulable phosphor sheet. Furthermore, instead of light which has passed through the X-ray film 30 being detected, light reflected by the X-ray film 30 may be detected.

The method for judging the correctness or incorrectness of a subdivision pattern detected on a recording medium in accordance with the present invention is applicable broadly when a judgment is to be made as to whether a detected subdivision pattern is or is not correct.

We claim:

1. A method for judging the correctness or incorrectness of a subdivision pattern which has been detected on a recording medium, which comprises the steps of:
   i) detecting the subdivision pattern in cases where the entire recording area of a recording medium was divided into a plurality of regions and radiation images were recorded in the respective regions, the subdivision pattern being determined from the characteristics of an image signal made up of a series of image signal components and obtained from a recording medium which has been subjected to radiation image recording,
   ii) calculating a characteristic value for the image signal components corresponding to each of the subdivided regions,
   iii) comparing said characteristic value with a predetermined value, and
   iv) basing a judgment as to whether the detected subdivision pattern is or is not correct on the results of the comparison made between said characteristic value corresponding to each of the subdivided regions and said predetermined value.

* * * * *